(12) United States Patent
Olson et al.

(10) Patent No.: US 10,838,065 B2
(45) Date of Patent: Nov. 17, 2020

(54) LOCALIZATION USING 2D MAPS WHICH CAPTURE VERTICAL STRUCTURES IN 3D POINT DATA

(71) Applicant: The Regents of The University of Michigan, Ann Arbor, MI (US)

(72) Inventors: Edwin Olson, Ann Arbor, MI (US); Carl Kershaw, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 385 days.

(21) Appl. No.: 15/881,026

(22) Filed: Jan. 26, 2018

(65) Prior Publication Data

US 2018/0210087 A1    Jul. 26, 2018

Related U.S. Application Data

(60) Provisional application No. 62/450,616, filed on Jan. 26, 2017.

(51) Int. Cl.
*G01S 17/89* (2020.01)
*G01S 17/42* (2006.01)
(Continued)

(52) U.S. Cl.
CPC .......... *G01S 17/89* (2013.01); *G01S 7/4808* (2013.01); *G01S 17/42* (2013.01);
(Continued)

(58) Field of Classification Search
CPC ........ G01S 17/89; G01S 7/4808; G01S 17/42; G01S 17/931; G06T 11/206; G06K 9/00805
See application file for complete search history.

(56) References Cited

U.S. PATENT DOCUMENTS 8,280,623 B2    10/2012    Trepagnier et al.
8,364,334 B2    1/2013    Au et al.
(Continued)

FOREIGN PATENT DOCUMENTS

WO    WO-2018140748 A1 *    8/2018    ............. G01S 17/89

OTHER PUBLICATIONS

E. Olson, "M3RSM: Many-to-Many Multi-Resolution Scan Matching", Robotics and Automation (ICRA), 2015 IEEE International Conference (May 26-30, 2015).
(Continued)

*Primary Examiner* — Daniel Pihulic
(74) *Attorney, Agent, or Firm* — Harness, Dickey & Pierce, P.L.C.

(57) ABSTRACT

Autonomous vehicles require precise localization to support safe and reliable operation. Current systems aim to localize in 6DOF based on observations from a combination of cameras and 3D LiDAR, matching against dense, 3D prior maps. These maps are quite large and complex, presenting both computational and physical challenges in terms of matching, storage, and retrieval. Most of the environments where vehicles operate in contain frequent and distinct vertical structure sufficient for 2D localization, while state-of-the-art IMUs can be used to recover roll and pitch. This disclosure introduces a fast method for constructing 2D maps summarizing the vertical structure in the environment and demonstrate that it can be used to localize accurately in vehicular and other applications.

19 Claims, 9 Drawing Sheets

(51) Int. Cl.
*G06K 9/00* (2006.01)
*G06T 11/20* (2006.01)
*G01S 7/48* (2006.01)
*G01S 17/931* (2020.01)

(52) U.S. Cl.
CPC ........ *G06K 9/00805* (2013.01); *G06T 11/206* (2013.01); *G01S 17/931* (2020.01)

(56) References Cited

U.S. PATENT DOCUMENTS

| | | |
|---|---|---|
| 8,473,144 B1 | 6/2013 | Dolgov et al. |
| 8,612,135 B1 | 12/2013 | Montemerlo et al. |
| 9,037,396 B2 | 5/2015 | Pack et al. |
| 9,205,835 B2 | 12/2015 | Stein et al. |
| 9,378,554 B2 | 6/2016 | Chang et al. |
| 9,386,209 B2 | 7/2016 | Kim et al. |
| 2007/0003107 A1 | 1/2007 | Wei et al. |
| 2009/0030605 A1 | 1/2009 | Breed |
| 2010/0076642 A1 | 3/2010 | Hoffberg et al. |
| 2012/0046820 A1 | 2/2012 | Allard et al. |
| 2013/0211656 A1 | 8/2013 | An et al. |
| 2018/0210087 A1* | 7/2018 | Olson ................ G01S 7/4808 |

OTHER PUBLICATIONS

E. Olson et al, "Inference on Networks of Mixtures for Robust Robot Mapping", Proceedings of Robotics: Science and Systems (RSS), Sydney, Australia (Jul. 2012).
R. W. Wolcott et al, "Fast LIDAR Localization Using Multiresolution Gaussian Mixture Maps", Proceedings of the IEEE International Conference on Robotics and Automation, Seattle, WA (May 2015).

* cited by examiner

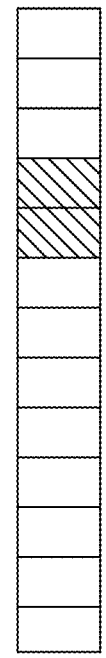
FIG. 2A  FIG. 2B
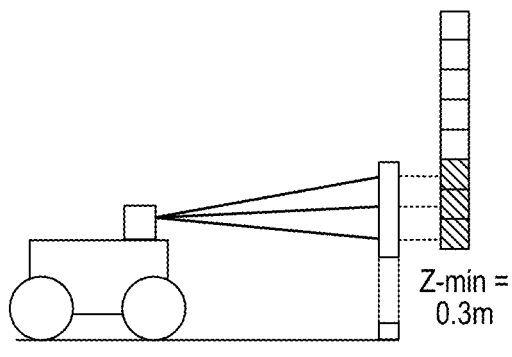
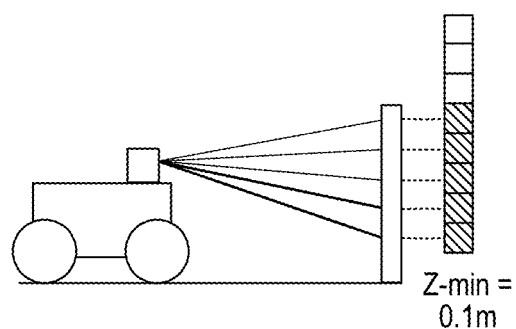
FIG. 3A  FIG. 3B

LOCALIZATION USING 2D MAPS WHICH CAPTURE VERTICAL STRUCTURES IN 3D POINT DATA

CROSS-REFERENCE TO RELATED APPLICATIONS

This application claims the benefit of U.S. Provisional Application No. 62/450,616, filed on Jan. 26, 2017. The entire disclosure of the above application is incorporated herein by reference.

GOVERNMENT CLAUSE

This invention was made with government support under Grant No. N00014-13-1-0217 awarded by the Office of Naval Research and Grant No. D13AP00059 awarded by the Department of the Interior/DARPA. The Government has certain rights in this invention.

FIELD

The present disclosure relates to techniques for fast localization of objects, such as robots or vehicles, using 2D maps which capture vertical structure in 3D point data.

BACKGROUND

To perform even the most basic tasks, autonomous vehicles require fast and accurate localization estimates. Even a simple action such as lane holding can transition from routine to catastrophic due to a small (e.g., 0.5 m) error in its position estimate. Consumer grade GPS is insufficiently accurate to support these needs, which has resulted in the development of algorithms based on data from LiDAR and cameras.

3D LiDAR has proven particularly popular on state-of-the-art autonomous vehicles due to its accuracy and ability to produce fast, 360° field of view (FOV) information about the surrounding environment. Additionally, 3D LiDAR sensors are more robust to occlusion than their 2D counterparts. However, the data from these sensors can be challenging to use in localization applications. The dense 3D prior maps necessary to support 3D matching operations take up large amounts of storage space, making it impractical to locally store full 3D maps of large geographic regions. Indeed, it can take hundreds of MBs of storage for even a small urban region. On the other hand, systems cannot tolerate the risks incurred by fetching data on-demand from a remote source.

Assuming the storage challenges have been overcome, alignment and localization in six degrees of freedom still present challenges. Traditional 3D alignment algorithms like Iterative Closest Point (ICP) have poor convergence properties and require good initial registration to produce high quality alignments. Non-uniformity in 3D LiDAR data can exacerbate convergence issues.

2D LiDAR sensors have been used to great effect in many environments. Prior map representations are compact and efficient to match against. However, the planar nature of these sensors makes them susceptible to errors due to occlusion by transient obstacles, or complete failure to observe off-plane hazards. Thus, it is desirable to find a way to use rich, robust 3D LiDAR information as efficiently as existing 2D data.

SUMMARY

This section provides a general summary of the disclosure, and is not a comprehensive disclosure of its full scope or all of its features.

In one aspect, a method is provided for generating a two-dimensional representation of structures in a scene. The method includes: receiving three-dimensional point data of a scene; partitioning ground of the scene into a plurality of cells; projecting points from the three-dimensional point data into the plurality of cells; recording, for each cell in the plurality of cells, heights at which the points occur within the cell; determining, for each cell in the plurality of cells, a property of the points within the cell; and generating a two-dimensional representation of the scene from the properties determined in each cell in the plurality of cells. The three-dimensional point data may be captured using a LiDAR sensor or another type of sensor.

Recording heights at which the points occur in the cell includes quantizing heights into elements of a column vector and thereby forming a plurality of vector columns, where each element in the column vector corresponds to a different range of heights above a reference point. In some embodiments, heights in elements of a column vector are quantized by encoding presence or absence of a point in a given element as a binary number. The number of elements in a column vector is less than or equal to size of an integer data type of a processing unit. Additionally, each cell may include a height offset value that shift the meaning of each bit in the column vector.

In one embodiment, a property of the points in a given cell is determined by performing a population count on the given cell. In other embodiments, a property of the points in a given cell is determined through a sequence of bit-wise AND and population counts on the given cells.

Upon receiving a new point that falls outside the range of heights defined by a given column vector, the range of heights is adjusted by bit shifting elements in the given column vector.

In another aspect, a method is presented for determining location of a movable object. The method includes: collecting three-dimensional point data of a scene surrounding the movable object; transforming the three-dimensional point data to a current two-dimensional map of structures in the scene by representing the verticality of any structure detected in the scene with a column vector, where each element in the column vector corresponds to a different range of heights above a reference point; matching the current two-dimensional map to one or more of a set of two-dimensional candidate maps, where each two-dimensional candidate map in the set of two-dimensional candidate maps includes global coordinates; and determining location of the movable object using one or more matched two-dimensional candidate maps.

Matching the current two-dimensional map to one or more of a set of two-dimensional candidate maps includes estimating a current location of the movable object; and identifying the set of two-dimensional candidate maps from a plurality of predetermined two-dimensional maps using the current location of the movable object. Matching the current two-dimensional map to one or more of a set of two-dimensional candidate maps may further include aligning the current two-dimensional map with each two-dimensional candidate map in the set of two-dimensional candidate maps and thereby determine a position estimate for the current two-dimensional map in relation to each two-dimensional candidate map in the set of two-dimensional candidate maps. The set of two-dimensional candidate maps can also be filtered based on alignment with the current two-dimensional map and prior to the step of determining location of the movable object.

In one embodiment, the location of the movable object is determined using particle filters.

In other embodiments, the location of the movable object includes constructing a factor graph using the position estimates for the current two-dimensional map in relation to each two-dimensional candidate map in the set of two-dimensional candidate maps and solving the factor graph using a nonlinear least squares method, where nodes in the factor graph represent known and unknown locations of the movable object and edges in the factor graph represent observations that relate values of nodes to each other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B are diagrams of a column vector representing the verticality of a stop sign and an overpass, respectively;

FIGS. 3A and 3B are diagrams showing a bit shifting to align the column vector at the lowest observed height;

Corresponding reference numerals indicate corresponding parts throughout the several views of the drawings.

DETAILED DESCRIPTION

Example embodiments will now be described more fully with reference to the accompanying drawings.

The most commonly applied 2D structure extraction methods are built around a quantization of the world in XY space. In the simplest case, range returns falling within a specified z-height band relative to the ground are projected down into this grid and marked as obstacles. This works well for hazard estimation, but is very susceptible to noise. Alternatively, one can partition the world into voxels, only marking structure on a 2D summary map where the number of occupied voxels in a vertical line exceeds the specified threshold. This ensures a certain level of verticality (with high repeatability) in the detected structure. One weakness of these methods is their inability to deal with negative obstacles. Negative obstacles may generate no or very distance range returns, causing them to not appear in the map at all. Issues also arise from quantization errors due to noise.

Figure 1:
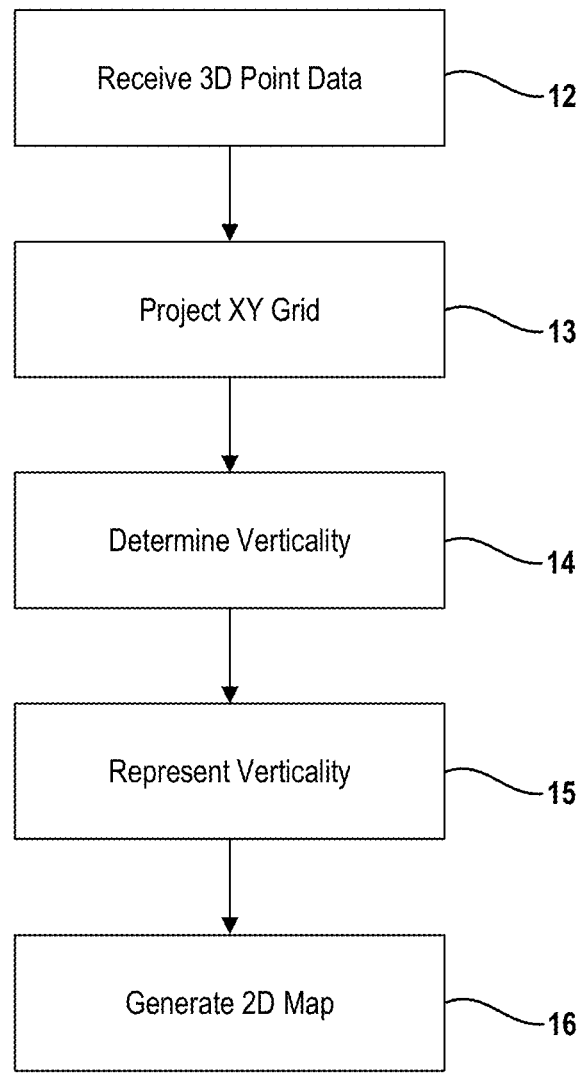
FIG. 1 is a flowchart depicting an improved method for generating a two-dimensional representation of structures in a scene from three-dimensional point data.

FIG. 1 depicts an improved method for generating a two-dimensional representation (or map) of structures in a scene from three-dimensional point data. To begin, 3D point data of a scene is received as indicated at 12. The 3D point data may be captured, for example by a LiDAR sensor mounted on a movable object, such as a robot or a vehicle. For ease of explanation, this application makes reference to the movable object as being a robot. It is understood that other types of movable objects fall within the scope of this disclosure. Other techniques for capturing 3D point data are also contemplated by this disclosure.

To partition the scene, points from the 3D point data are projected onto cells on an X-Y plane (e.g., the ground) of the scene. For example, data points may be projected onto an XY grid at 13. For each cell in the XY grid, the verticality (or height) of any object detected in a given cell is determined at 14. For example, a cell that contains a stop sign would have verticality from the lowest observed height to about seven feet above the ground but no verticality above seven feet. In the case of a road overpass, verticality may occur between twelve and fourteen feet above the ground but nothing above or below. From these examples, one would understand that different types of objects having different verticality and the heights at which the points occur in a cell are recorded.

For each cell in the XY grid, the verticality of any detected object is represented at 15 by a column vector (i.e., m×1 matrix), where each element in the column vector corresponds to a different range of heights above some reference height. The reference height can be fixed for all cells or dynamically adjusted for each cell. In the latter case, the height of the lowest verticality can be used as the reference height so that m×1 column vector has the largest range of useful verticality. Representing each cell in the XY grid with a column vector results in a plurality of column vectors. Continuing with the example set forth above, the verticality of a stop sign is represented by the shaded boxes in a column vector as shown in FIG. 2A; whereas, the verticality of an overpass is represented by the shaded boxes in a column vector as shown in FIG. 2B. In this figure, the reference height is the robot's height for all cells. This type of voxel representation is compact and fast. When the reference height is adjusted for each cell, it is additionally adaptive to local terrain height.

In an example embodiment, the verticality of a space is represented by a column vector having 64 elements, where each element stores a binary value. One element may also be used to store a minimum z-height. Each element of the vector corresponds to a fixed band of vertical range (e.g., 10 cm). This range can be tailored to focus on a particular region of interest (i.e. 20 cm to 200 cm) relative to the minimum z-height. This z-height can be dynamically updated as observations are added, for example by shifting the region of interest to be relative to the lowest observed point. Updates to the minimum z-height can be applied via simple bit shifts as seen in FIGS. 3A and 3B.

In this embodiment, the identification of a vertical structure can be performed with a POPCOUNT operation on the column vector: if the number of bits set to 1 exceeds a threshold, the cell passes a verticality test and is marked as a structure. Additionally, one may efficiently isolate smaller vertical bands of data with bit-masking operations: for example, isolating obstacles the same height as the vehicle or isolating obstacles the same height as road overpass. Through bit-masking and POPCOUNT, a wide range of useful classifiers can be efficiently implemented.

The representation may be further improved by working in polar coordinates. Most 3D LiDAR sensors operate by rotating a vertical fan of lasers, resulting in an obvious relationship between the data and a polar coordinate frame. By binning in polar coordinates, costly projection into Cartesian coordinates is avoided. Similarly, quantization error now only occur in the range dimension, rather than in both X and Y. SHG is an instance of a polar binning method and is described by T. Korah et al in "Strip Histogram Grid for Efficient LiDAR Segmentation from Urban Environments" in Computer Vision and Pattern Recognition Workshops (CVPRW), 2011 IEEE Computer Society Conference (2011) which is incorporated herein by reference.

Returning to FIG. 1, a two-dimensional representation of the scene is generated at 16 from the plurality of vector columns. A two-dimensional representation of immovable structures in the scene may be generated by applying a rule set to the plurality of vector columns, where the rule set distinguishes immovable structures from other objects detected in the scene. For example, if a column vector has at least some critical number of bits set, or if those bits span a particular z height, or if those bits represent object detections in some important range of z heights, a classifier may classify that given x,y cell as containing an obstacle. A key contribution of this disclosure is that the representation of LIDAR turns into a bit vector allows these types of tests to be efficiently computed. The particular classification criteria used is naturally a function of a particular application and is generally found empirically. However, it is also possible to optimize these rules using machine learning tools, for example by maximizing the agreement between the output of the classifier and a ground-truth dataset.

One extension to 2D structure representation is to represent multiple classes of structures in one 2D map. In navigation applications, one finds that it is helpful to distinguish between a hazard, an obstacle to navigation and SLAM-able structure, i.e. vertical structure that can be reliably scan matched against. In this way, navigation systems and localizations systems are supported with the same data stream without adversely affecting the performance of either. This is accomplished by using multiple classifiers tuned for different types of objects. Each classifier is applied to each grid cell, producing multiple labels for each (x,y) cell. These need not be mutually exclusive: a single (x,y) cell might be recognized both as a "tree" and an "obstacle", for example.

Figure 4:
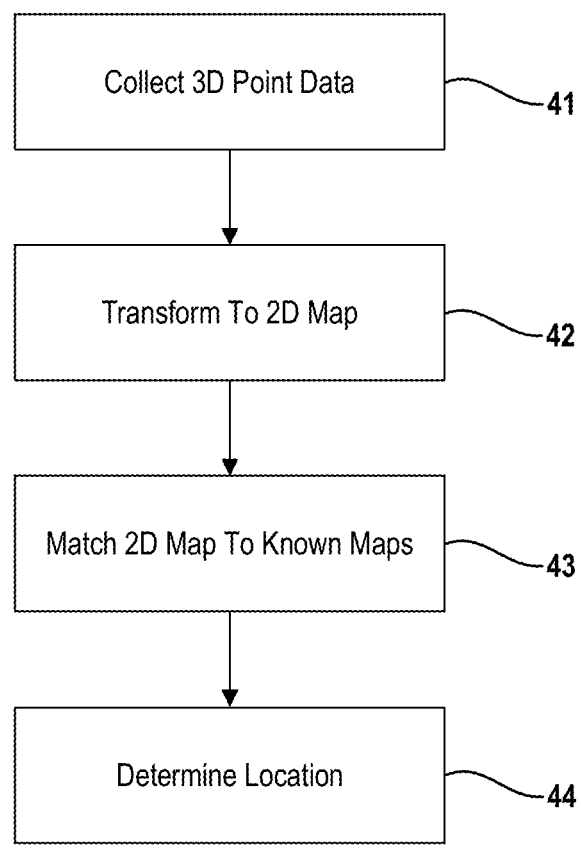
FIG. 4 is a flowchart depicting an example method for determining location of a movable object.

Two-dimensional maps of a scene can then be used in different applications. For example, a method for determining location of a movable object (e.g., a robot) is shown in FIG. 4. By way of background, two coordinate systems are defined in which the robot can operate: local and global. In one embodiment, the robot's local coordinates are determined by its open-loop odometry; whereas, the robot's global coordinates are the actual position of the robot in the world (e.g. latitude and longitudinal geographic coordinates). The goal of localization is to compute a transformation that can convert local coordinates of the robot into global coordinates. Methods presented in this disclosure may also be implemented as part of simultaneous localization and mapping (SLAM) systems.

Three-dimensional point data of a scene surrounding the robot is collected at 41, for example by a LIDAR sensor mounted to the robot. The three-dimensional point data is then transformed at 42 to a two-dimensional map in the manner described above. Each pixel in this map is the output of the classifier operating on the cell's verticality vector. For localization, the classifier is typically chosen to be one that preserves large immovable objects (such as signs and buildings) but rejects non-permanent objects (snow, pedestrians, cars, etc.) This map may be binary-valued (i.e., one if the classifier says "immovable object", zero otherwise) or continuous-valued (i.e., where larger values indicate greater confidence that the object is immovable). This 2D map may be referred to below as the unknown 2D map.

To determine global coordinates, the unknown two-dimensional map is matched at 43 to one of a plurality of predetermined two-dimensional maps. The plurality of predetermined two-dimensional maps are determined in advance and stored in a data store by the robot. Each predetermined 2D map depicts a scene at a different location and includes global coordinates or another means to translate local coordinates to global coordinates. The 2D map is matched to one or more of the plurality of predetermined 2D maps using a scan matching method as will be further described below.

Figure 5:
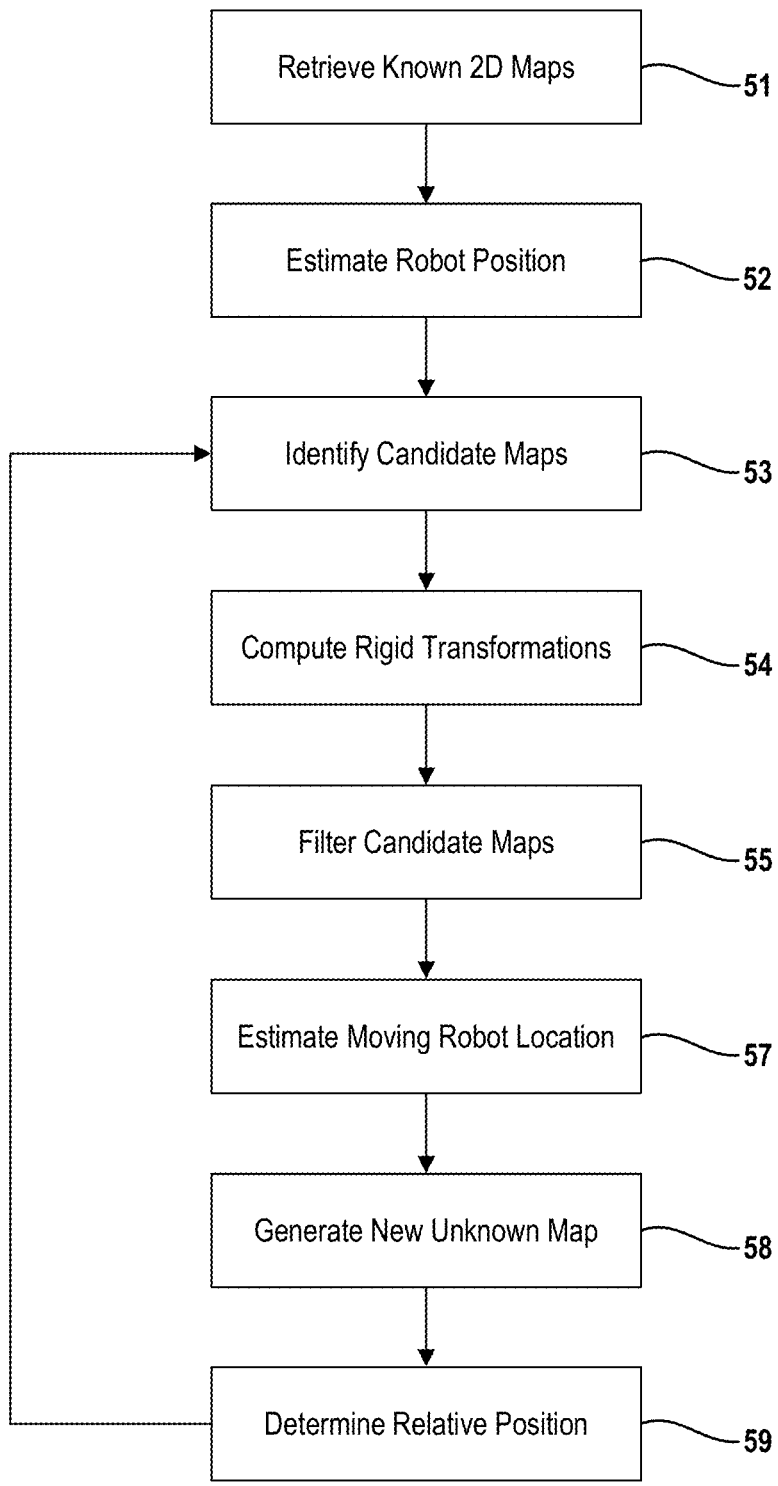
FIG. 5 is a flowchart depicting an example method for matching an unknown 2D map to one or more of a plurality of predetermined 2D maps.

FIG. 5 depicts an example embodiment for matching an unknown 2D map to one or more of a plurality of predetermined 2D maps. As a starting point, the plurality of predetermined 2D maps are retrieved at 51 from a data store. Each predetermined 2D map includes global coordinate at which the data used to derive the 2D map was captured and/or additional information that allows the global coordinates of each point within the map to be computed.

Additionally, an initial estimate of the robot's position is made at 52. The robot's current position is expressed as global coordinates, i.e., the location at which the data used to derive the unknown 2D map was collected by the robot. In one example, the current location may be obtained from a GPS receiver residing on the robot. In another example, a user may designate the current location of the robot on a displayed map. Other methods for determining a starting location for the robot are contemplated by this disclosure. One can assume that the estimate obtained by 52 is generally of low accuracy and/or reliability.

A subset of candidate 2D maps are extracted at 53 from the plurality of predetermined 2D maps using the current location of the robot. For instance, the subset of candidate 2D maps may be those maps that are near the estimated current location of the robot, with "nearness" being a function of the confidence of the estimated current location. Or the robot might simply use all maps having a distance less than some threshold distance (for example 100 meters) from the estimated current location of the robot. Some candidate maps may be rejected due to being unsuitable for the alignment process. Possible reasons for this rejection may include having very few pixels, having pixels that do not constrain the matching process in each direction, or having repeated structure that makes alignment ambiguous.

An alignment procedure is then performed at 54 for each of the candidate 2D maps in the subset of candidate 2D maps. That is, a rigid transformation is computed between the unknown 2D map and each of the candidate 2D maps. Different techniques for computing a rigid transformation are known in the art, including scan match methods. One example scan matching method suitable for use in this application may be found in an article by Edwin Olson entitled "M3RSM: Many-to-Many Multi-Resolution Scan Matching" in the Proceedings—IEEE International Conference on Robotics and Automation (June 2015) which is incorporated herein in its entirety by reference. Each rigid transformation is equivalent to a position estimate for the robot, since it relates the position of the robot in the current map to the position of the robot in a previous map, and the previous map's global position is known. Other possible example scan matching methods include the use of polar coordinates, histogram-based methods, feature-based methods, and Iterative Closest-Point methods.

In some embodiments, the set of candidate 2D maps may be further filtered or reduced at 55 based on the output of the rigid-boy transformations. In one example, a given candidate 2D map may be excluded when the alignment procedure produces an alignment with a low figure-of-merit. For example, alignments might be rejected when the overlap between the maps is small (e.g., less than 100 matching pixels), or where multiple alignments with similar figures-of-merit are found (which indicates ambiguity in the solution).

Each rigid-body transformation contains evidence regarding the current position of the robot. One method for combining this evidence is a particle filter. The idea behind particle filters is that one maintains a set of possible vehicle trajectories, such that each candidate trajectory is a "particle" in a high dimensional space. Each rigid-body transformation is compared against the belief asserted by each particle. Those particles whose trajectories best align with the transformations get high scores; whereas, those that align poorly get low scores. The particle with the best score is taken as the most likely trajectory. This application of particle filters is known in the art.

Figure 6:
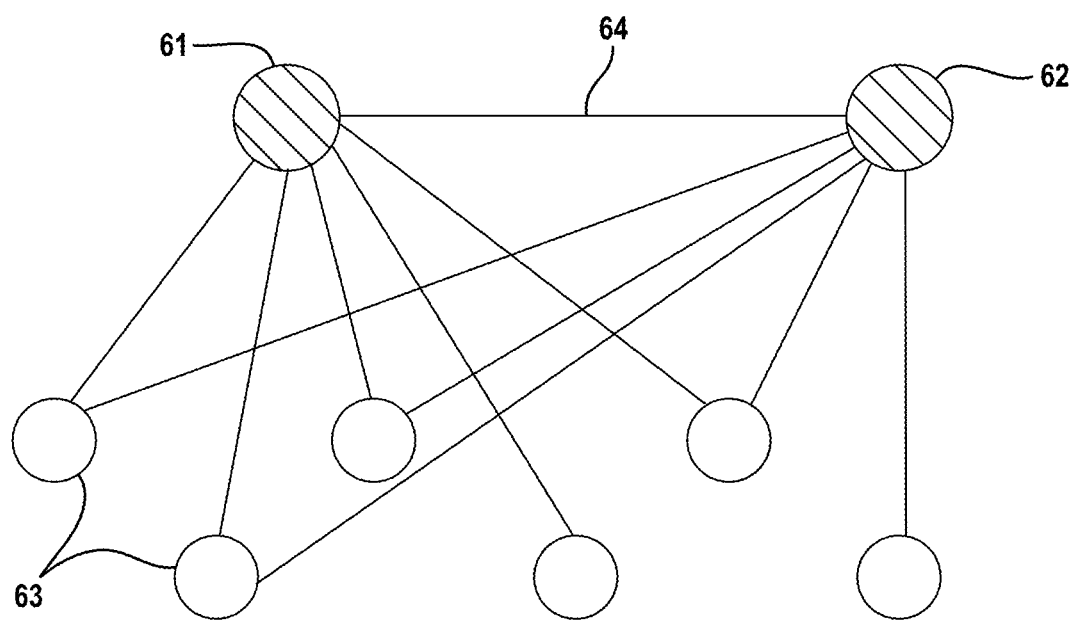
FIG. 6 is a diagram of a partial factor graph.

Alternatively, the set of rigid-body transformations can be viewed as an optimization problem, in which the goal is to find the current vehicle position that best agrees with the transformations. An iterative non-linear least squares approach can be adopted to determine an optimized estimate for the robot's location. As is known in the art, this least-squares problem can be visually depicted as a "factor graph"; as illustrated by FIG. 6, one might elect to depict unknown values by shaded circles, known values by empty circles, and equations (or observations) that relate values as edges. In a preferred embodiment, a factor graph is constructed. Solving the resulting graph yields the present location for the robot. Over time, additional nodes for the trajectory of the robot are added to the factor graph, such that solving the graph also yield location estimates for these additional trajectory points. One advantage of formulating localization as a graph-solving problem is the ability to incorporate concepts like max mixture edges into solutions. Max mixture edges allow the system to reject erroneous observations, for example, due to a bad scan match or bad GPS fix, preventing sudden, catastrophic shifts in the location estimates. Another advantage of the graph-solving approach versus particle filters is that particle depletion cannot occur.

With reference to FIG. 6, an example of a factor graph is further described. Shaded nodes in the graph represent the unknown locations of the robot. In particular, a starting location for the robot is designated by node 61 and another location along the trajectory of the robot is designated by node 62. The edge 64 between these two nodes represents the relative movement between the two locations. In one embodiment, the movement is defined by a set of equations whose values are derived on onboard sensors, such as an odometer or accelerometer. As the robot moves, it is understood that more nodes with unknown locations may be added to the graph at periodic computational intervals.

The remaining nodes 63 in the graph represent known locations associated with a candidate 2D maps. At a first computational interval, output from the rigid transformation step is received for a first set of candidate 2D maps, where each candidate 2D map includes a known location. A node is then added to the graph for each candidate 2D map and connected to starting node 61, such that the corresponding rigid transform serves as the edge between a given candidate 2D map and the starting node 61. In other words, the edge represents the difference in position between the nodes. In one embodiment, this difference is defined by a set of equations output by the rigid transformation. It is envisioned that other factors (e.g., GPS observations) may be incorporated into the graph but will be weighted considerably less than the scan matching factors.

As the robot moves along, it will continue to collect 3D point data of the surrounding scene and generate new 2D maps at periodic computational intervals. For each new 2D map, the localization process set forth above can be repeated and thereby generate another set of candidate 2D maps. A second set of candidate 2D maps are associated with node 62. In many instances, a node for the candidate 2D map is already found in the factor graph. In these instances, new edges connecting these nodes to node 62 are added to the graph. In some instances, a node for a given candidate 2D map in the second set of candidate 2D maps is not found in the graph. In these instances, a new corresponding node is added to the graph. It is envisioned that the factor graph can be updated in this manner for each new set of candidate 2D maps.

Unfortunately, this formulation does not come without a cost. The longer the vehicle is in operation, the more nodes and factors accumulate in the graph, resulting in increasing memory consumption and slower solve times. To prevent excessive accumulation, fix the maximum number of nodes in the graph. When new observations would result in this threshold being exceeded, the oldest observations are removed from the graph, allowing the localization system to operate in a fixed memory footprint and with stable solution times. Other graph simplification algorithms, known in the art, are also applicable and fall within the scope of this disclosure.

Returning to FIG. 5, the unknown locations of the robot are estimated at 57 by solving the factor graph. In a general sense, a robust non-linear least square solver may be used to solve this problem and such solvers are readily found in the art. One particular example method is the max mixtures approach described in an article by Edwin Olson et. al. entitled "Inference on Networks of Mixtures for Robust Robot Mapping" International Journal of Robotics Research, 32(7):826-840, July 2013 which is incorporated in its entirety by reference. Other methods for solving non-linear least square problems also fall within the scope of this disclosure.

As noted above, the robot will continue to collect 3D point data of the surrounding scene and generate new 2D maps for the surrounding scene as indicated at 58. At each new computational interval, a determination is made at 59 regarding the relative change in position by the robot. This relative change in position will be used to construct the factor graph and may be derived from on onboard sensors, such as an odometer or an accelerometer. Furthermore, this relative change in position can be used to identifying a new set of candidate 2D maps at 53. Given a new unknown 2D map and a corresponding robot position, the process is repeated.

The principle advantage of incrementally building, and then solving, the factor graph is that more information about the current position of the robot can be brought to bear simultaneously. With each additional edge in the factor graph, it becomes easier to identify incorrect measurements and to attenuate the effects of the noise in each individual edge. The current location of the robot can thus be found with high accuracy and high robustness.

In some embodiments, the robot may have one or more systems capable of generating local to global coordinate estimates, including but not limited to GPS and scan matching against a known map. It may be convenient to formulate the challenge of merging these estimates as an equivalent to solving a simultaneous localization and mapping problem: each local-to-global estimator produces noisy observations in which one places a certain amount of confidence. Thus, one can find the Maximum Likelihood Estimate (MEL) by minimizing the error among these separate estimates.

Experimental results are discussed for the mapping and localization technique described above. Variations of the example system were deployed on two platforms: the Smart-Carts autonomous golf cart as well as a MAGIC 2.0 mapping robot. Both platforms are powered by an Ubuntu 14.04 laptop equipped with an Intel i7-4900MQ clocked at 2.8 GHz and 8 GB of RAM.

The 2D structure classification was validated on two scenes: one to demonstrate that hazard detection threshold maps adapt well to real-world sloped obstacles, and another to validate that one may classify a wide range of vertical structure, even in the presence of partial occlusion.

To prove that the proposed method is able to correctly distinguish between real-world navigation hazards, a scene is created containing ramps of slope 10, 14.5, and 16°. These angles were chosen to be near an example hazard threshold of 15°. One expects that the 10 and 14.5° ramp will be marked as safe, while the 16° ramp will be marked hazardous. The robot captured the scene from several meters away, viewing the ramps from their lower, ground-level ends. The terrain classifier successfully marked the 10° ramp as drivable, and the 16° ramp as hazardous, as expected based on the threshold. Due to sensor noise, parts of the 14.5° ramp were marked as hazardous as well. This demonstrates that the hazard detection system is working correctly, but is not entirely robust to noise.

An additional scene was set up to demonstrate that the proposed method can preserve information about partially occluded structure, ensuring that useful scan matching features are not removed from the map. The scene consisted of several vertical structures ranging from 0.1 m to 1 m in height, spaced evenly apart in ascending order by height. The robot was placed to view this scene end on, such that the taller structures were partially obscured by the shorter structures.

Figure 7:
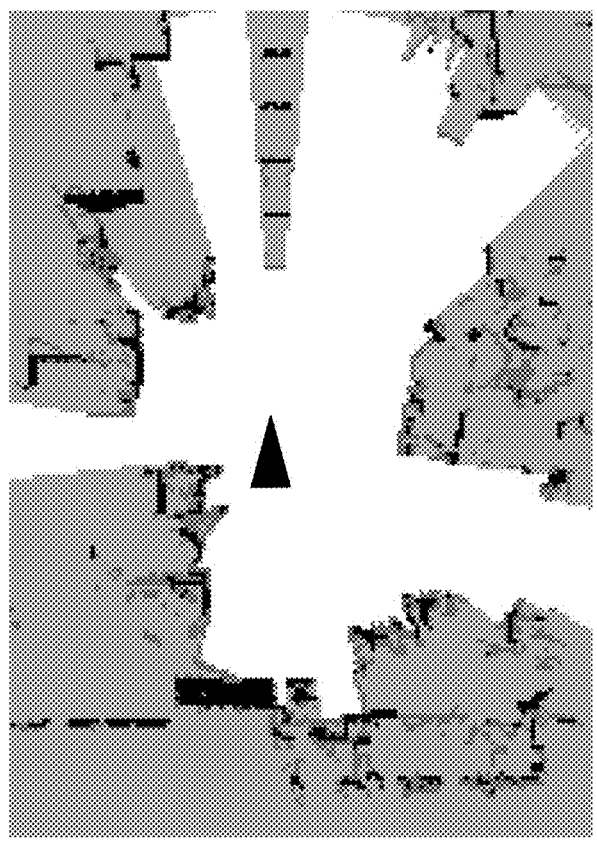
FIG. 7 is an example 2D map representing obstacles of varying heights.

Five bands of structure are clearly visible in front of the robot as seen in FIG. 7. Only one band of LiDAR strikes fell on the smallest object, a 0.1 m tall box. As a result, its vertical face was not detected and it was only marked as hazardous, non-SLAMmable structure. However, the rest of the structure was correctly identified as sufficiently vertical to be marked as slammable and accurately placed in the grip map. This shows that the proposed algorithm can correctly identify and denote vertical structure in the environment for use in 2D scan matching.

Figure 8A:
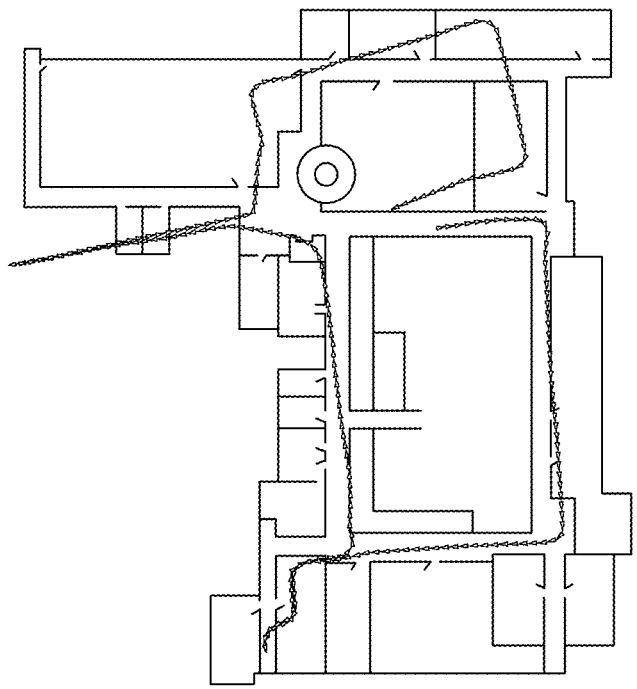
FIGS. 8A and 8B are maps produced by the SLAM system for an open-loop trajectory and a corrected trajectory, respectively.
Figure 8B:
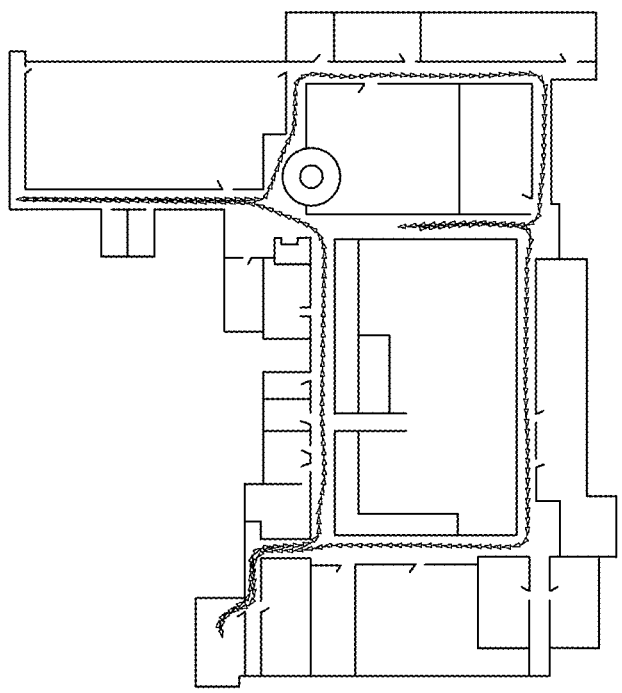

One advantage of 2D storage is the compactness of the map representation. The occupancy grid implementation stores class labels for each cell using a single byte, with each cell corresponding to a 5×5 cm area in the world. A prior map produced by the SLAM system can be seen in FIGS. 8A and 8B. The map covers a region of size 74×85 m. Uncompressed, this map takes only 2.5 MB of space. However, the simple representation lends itself well to compression. After applying gzip to the map, it is compressed to a mere 84 kB. This is in line with expectations; maps contain large regions of open space which are easily compressed.

Additionally, the localization pipeline was tested on the MAGIC 2.0 platform, a system designed for dual indoor/outdoor use. The MAGIC 2.0 robot was equipped with a MEMS grade gyro, wheel encoders, and a Velodyne VPL-16 mounted approximately 0.6 m above the ground. A fiber-optic gyro (FOG) was used to acquire close-to-ground-truth orientation estimates over the scale of a single pass of the building. A map of the $3^{rd}$ floor of our building was generated and evaluated by the localization system based on a log of a separate, hand-driven traversal. Results for open loop pose vs. corrected global pose can be seen in FIGS. 8A and 8B. Even as the open-loop odometry drifts, the localization system is able to correct for these errors, keeping the robot in the middle of the hallways at all times.

Next, different parts of the SLAM system are numerically evaluated against results from the FOG ground-truth, which measures rotation about θ. By contrasting the FOG θ estimate against the global one produced by localization when employing different occupancy grid generation pipelines, one identifies the best combination of features to implement and the appropriate parameterizations. To quantify the quality of localization, distributions of theta error sampled at discrete time steps are presented and binned by steps of 0.005 radians of angular error (roughly equivalent to a 0.25°).

Figure 9:
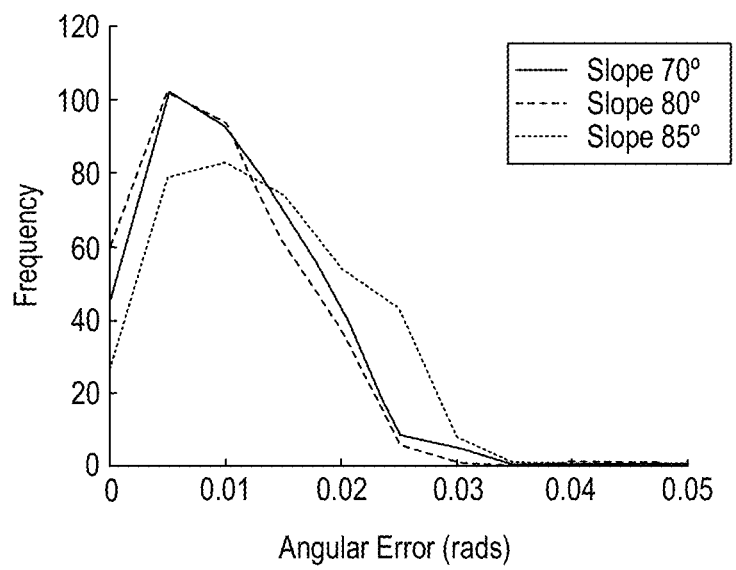
FIG. 9 is a graph showing the frequency of angular errors in radians for localization based on varying thresholds of vertical structure classification.

First, examine the impact of various threshold settings for vertical structure detection in the slope based method. One expect overly high and low values to negatively impact scan matching results, resulting in low-quality localization. Localization was tested for a traversal of our test environment with the structure threshold set to 70, 80 and 85°. The resulting distributions of observed angular errors can be seen in FIG. 9.

One finds that the middle threshold of 80° performs best. This is in line with our expectations. Maps constructed based on the 85° threshold mark vertical structure less frequently, likely due to sensor noise. The scan matcher, with less or insufficient structure to constrain its matches, produces low quality matches as a result. In contrast, the 70° threshold is too permissive, marking non-vertical structure and sometimes dilating vertical structure. The scan matcher depends on crisp structure to acquire good matches, so this dilation hurts match (and thus localization) quality.

Next, examine the impact of employing a compact, polar-coordinate-based popcount method vs. the slope method with and without fill-in. One expects fill-in to boost performance, as distant observations can be more effectively matched by the scan matcher. It is expected that the polar and Cartesian methods will otherwise perform similarly.

Figure 10:
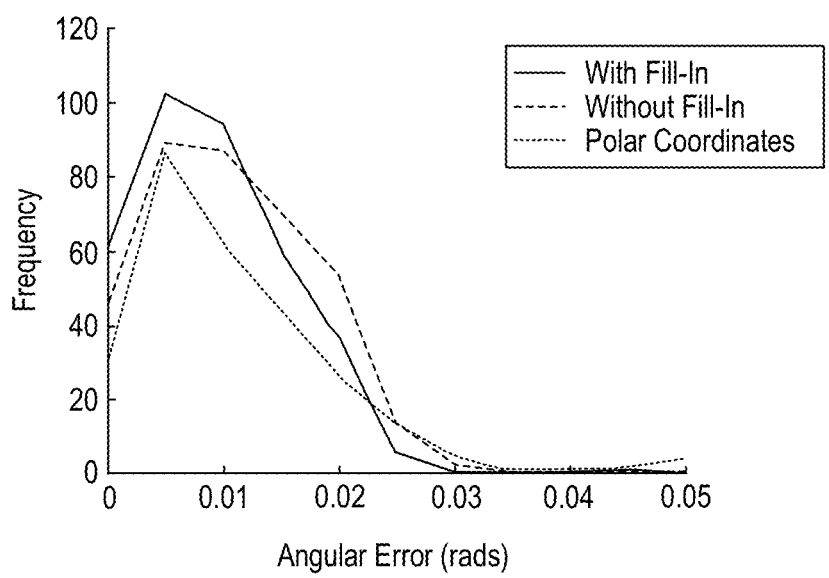
FIG. 10 is a graph showing the frequency of angular errors in radians for localization based on a polar occupancy map, a Cartesian occupancy grid, and a Cartesian occupancy grid with fill-in applied.

Bin size parameters were tuned to offer the best-case performance for each method. For the slope method, grip resolution was set to 5 cm and the slammable threshold was set to 80°. Fill-in, when used, was performed for points within 25 cm of each other. The polar popcount method was set to have bins 0.5° wide in θ and 5 cm in range. Structure was marked in bins with at least 2 bits marked. The resulting distribution of observed angular errors can be seen in FIG. 10.

Fill-in has the expected impact on the slope-based method, shifting the distribution of error closer to 0°. Unexpectedly, the polar popcount performs noticeably worse than both slope methods, exhibiting a large tail of errors in excess of 2.5°. Hypothesize that this is due to the bin size in the polar frame becoming more spread apart at large distances. The natural spread in bins negatively impacts scan matching, as long-range observations are smeared across wider and wider areas. This manifests as the larger angular errors seen in the results.

Figure 11:
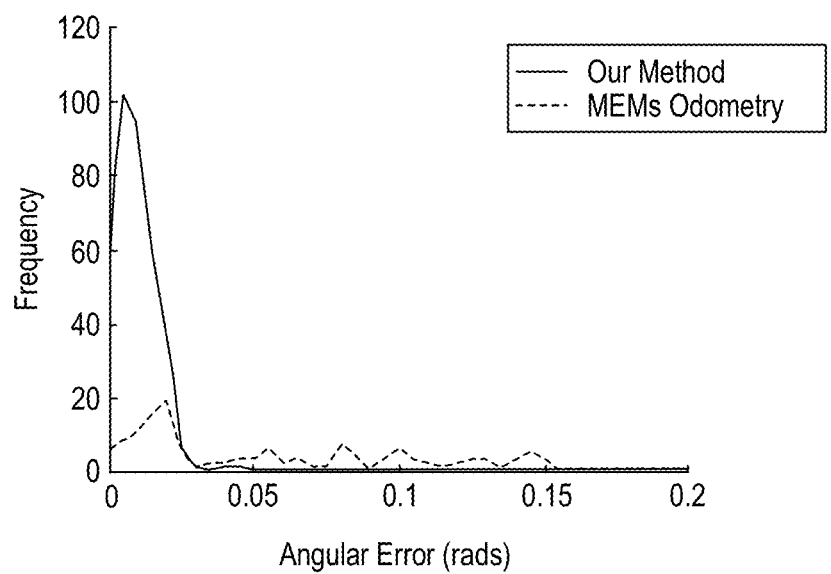
FIG. 11 is a graph showing frequency of angular errors in radians for localization for open-loop odometry compared to our final localization system.

Finally, a comparison is presented between our best-performing method from the previous analysis and open-loop, MEMs odometry. Odometry-based estimates are initially aligned with the global coordinate frame, but then allowed to draft naturally. The results can be seen in FIG. 11.

The θ estimates produced based on the robot's MEMs grade IMU drift significantly over the 10 min traversal of the building, accumulating a maximum error of nearly 9°. Conversely, 2D scan matching based on slope-based structure maps is able to localize the robot with 1° of ground-truth 87% of the time, 1.5° 97% of the time, and in the worst case, deviates from ground truth by just under 2.5°.

Localization pipeline was also tested outdoors on our SmartCarts autonomous golf cart platform. A vehicle was equipped with a FOG for yaw estimates, an encoder on the left-rear wheel, and a Velodyne HDL-32E for scan matching. Hand-annotated lanes were registered against a SLAM map of the environment gathered prior to testing. The robot was then driven to a start location and tasked to drive autonomously between several waypoints in the road network. The open loop odometry slowly accumulates error, even with high-grade sensors like a FOG. Matching scans against a 2D structure map corrects for this error, though, keeping the SmartCart within its lanes through the test.

In this disclosure, a localization system is presented that harnesses the rich structural data provided by 3D LiDAR sensors, but with the computational and storage efficiency of 2D methods. Two methods were introduced for extracting 2D structural information from 3D LiDAR in support of 2D scan matching as well as a localization method based on Graph-SLAM algorithms. The performance of these methods are quantified in a real-world system, evaluating predicted orientation estimates against high-quality estimates produced by a FOG.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for generating a two-dimensional representation of
structures in a scene, comprising:
receiving three-dimensional point data of a scene;
partitioning ground of the scene into a plurality of cells;
projecting points from the three-dimensional point data into the plurality of cells;
recording, for each cell in the plurality of cells, heights at which the points occur within the cell, wherein recording heights at which the points occur in the cell comprises quantizing heights into elements of a column vector and thereby forming a plurality of vector columns, where each element in the column vector corresponds to a different range of heights above a reference point;

determining, for each cell in the plurality of cells, a property of the points within the cell; and generating a two-dimensional representation of the scene from the properties determined in each cell in the plurality of cells.

2. The method of claim 1 further comprises capturing the three-dimensional point data from a LiDAR sensor.

3. The method of claim 1 wherein quantizing heights in elements of a column vector further comprises encoding presence or absence of a point in a given element as a binary number.

4. The method of claim 1 wherein a number of elements in a column vector is less than or equal to a size of an integer data type of a processing unit.

5. The method of claim 1 wherein each cell includes a height offset value that shifts the meaning of each bit in the column vector.

6. The method of claim 1 further comprises determining a property of the points in a given cell by performing a population count on the given cell.

7. The method of claim 1 further comprises determining a property of the points in a given cell through a sequence of bit-wise AND and population counts on the given cells.

8. The method of claim 1 wherein recording heights at which the point occurs further comprises receiving a new point that falls outside the range of heights defined by a given column vector and adjusting the range of heights by bit shifting elements in the given column vector based on the new point.

9. The method of claim 1 further comprises determining a property of the points in a cell by applying a rule set to the plurality of cells, where the rule set distinguishes immovable structures from other objects detected in the scene.

10. A method for determining a location of a movable object, comprising:

collecting three-dimensional point data of a scene surrounding the movable object;

transforming the three-dimensional point data to a current two-dimensional map of structures in the scene by representing the verticality of any structure detected in the scene with a column vector, where each element in the column vector corresponds to a different range of heights above a reference point;

matching the current two-dimensional map to one or more of a set of two-dimensional candidate maps, where each two-dimensional candidate map in the set of two-dimensional candidate maps includes global coordinates; and determining the location of the movable object using one or more matched two-dimensional candidate maps.

11. The method of claim 10 wherein transforming the three-dimensional point data to a two-dimensional map includes partitioning ground of the scene into a plurality of cells;

projecting points from the three-dimensional point data into the plurality of cells;

recording, for each cell in the plurality of cells, heights at which the points occur within the cell;

determining, for each cell in the plurality of cells, a property of the points within the cell; and generating a two-dimensional representation of the scene from the properties determined in each cell in the plurality of cells.

12. The method of claim 11 wherein recording heights at which the points occur in the cell comprises quantizing heights into elements of a column vector and thereby forming a plurality of vector columns, where each element in the column vector corresponds to a different range of heights above a reference point.

13. The method of claim 10 wherein matching the current two-dimensional map to one or more of a set of two-dimensional candidate maps includes estimating a current location of the movable object;

identifying the set of two-dimensional candidate maps from a plurality of predetermined two-dimensional maps using the current location of the movable object.

14. The method of claim 10 wherein matching the current two-dimensional map to one or more of a set of two-dimensional candidate maps includes aligning the current two-dimensional map with each two-dimensional candidate map in the set of two-dimensional candidate maps and thereby determine a position estimate for the current two-dimensional map in relation to each two-dimensional candidate map in the set of two-dimensional candidate maps.

15. The method of claim 14 wherein aligning the current two-dimensional map with each two-dimensional candidate map in the set of two-dimensional candidate maps includes computing a rigid transformation between the current two-dimensional map and each two-dimensional candidate map in the set of two-dimensional candidate maps.

16. The method of claim 15 further comprises filtering the set of two-dimensional candidate maps based on alignment with the current two-dimensional map and prior to the step of determining location of the movable object.

17. The method of claim 14 further comprises determining location of the movable object using particle filters.

18. The method of claim 14 wherein determining location of the movable object includes constructing a factor graph using the position estimates for the current two-dimensional map in relation to each two-dimensional candidate map in the set of two-dimensional candidate maps, where nodes in the factor graph represent known and unknown locations of the movable object and edges in the factor graph represent observations that relate values of nodes to each other; and solving the factor graph using a nonlinear least squares method.

19. The method of claim 10 further comprises collecting three-dimensional point data of the scene at a different location and repeating the steps to determine a location of the movable object at the different location.

* * * * *